United States Patent [19]

Ogura

[11] Patent Number: 4,626,303

[45] Date of Patent: Dec. 2, 1986

[54] PROCESS FOR MAKING ELECTRO-OPTIC ELEMENT

[75] Inventor: Makoto Ogura, Hiratsuka, Japan

[73] Assignee: Canon Kabushiki Kaisha, Tokyo, Japan

[21] Appl. No.: 779,296

[22] Filed: Sep. 23, 1985

Related U.S. Application Data

[63] Continuation of Ser. No. 543,448, Oct. 19, 1983, abandoned.

[30] Foreign Application Priority Data

Oct. 27, 1982 [JP] Japan .............................. 57-189692

[51] Int. Cl.⁴ .............................................. B32B 31/20
[52] U.S. Cl. ................................... 156/145; 350/330; 350/343; 350/344; 350/350 R; 350/350 F; 428/1
[58] Field of Search ............................. 445/23, 24, 25

[56] References Cited

U.S. PATENT DOCUMENTS

| | | |
|---|---|---|
| 3,742,600 | 7/1973 | Lowell .................. 350/344 |
| 3,926,502 | 12/1975 | Tanaka et al. ............ 350/343 |
| 3,994,568 | 11/1976 | King et al. .............. 350/344 |
| 4,341,445 | 7/1982 | Matsuyama et al. ......... 350/344 |
| 4,362,771 | 12/1982 | Umeda et al. ............. 350/344 |
| 4,425,030 | 1/1984 | Schmidt .................. 428/1 |

*Primary Examiner*—Caleb Weston
*Attorney, Agent, or Firm*—Fitzpatrick, Cella Harper & Scinto

[57] ABSTRACT

A process for making electro-optic elements are provided which comprises the steps of:
a. setting up an enclosure by sealing peripheral areas of a pair of electrode plates spaced at a given distance,
b. filling a liquid material capable of producing an electro-optical change, into the enclosure through a filling hole thereof, and
c. sealing the filling hole while applying pressure to the entire surface of the electrode plates constructing the enclosure.

24 Claims, 4 Drawing Figures

PROCESS FOR MAKING ELECTRO-OPTIC ELEMENT

This application is a continuation of application Ser. No. 543,448, filed Oct. 19, 1983, now abandoned.

BACKGROUND OF THE INVENTION

1. Field of the Invention

This invention relates to a process for making electro-optic elements and particularly liquid crystal display elements and liquid crystal-optical shutter arrays.

2. Description of the Prior Art

Recently, with growing demand for liquid crystal cells of larger size, higher quality, or more sophisticated functions, it has become desired to make uniform the thickness of liquid crystal cells as far as possible for improving characteristics thereof.

In order to achieve a given uniform cell thickness, there has been taken a measure which comprises dispersing glass fiber or fine glass beads with a definite diameter as an inner spacer in liquid crystal cells, thereby controlling the cell thickness depending upon the diameter of the fiber or beads.

However, this measure is unsatisfactory in the cases when liquid crystal cells are used as display parts of electronic devices such as desk or pocketsize calculators and wrist watches. They are desired to be thinner or lighter for the purpose of reducing the whole thickness or weight of the device. Therefore, electrode substrates of the cells are made of, for example, glass plates of 0.7 mm or less (preferably 0.5 mm) in thickness or plastic sheets of about 0.5 or about 0.4 mm in thickness. When a liquid crystal is sandwiched between a pair of such thin glass plates or plastic sheets, the electrode plates of the resulting liquid crystal display element are liable to undulate even when glass fiber or beads of a difinite diameter are distributed in the liquid crystal: in practice, no liquid crystal display cell of enough uniform thickness is obtained. It has been particulary difficult to uniform the cell thickness when thin glass plates or plastic sheets as mentioned above are used as electrode substrates for such large-sized liquid crystal display panels as requested for as display parts of personal computers and the like.

Nonuniform thickness of a liquid crystal layer due to the undulation or the like is undesirable for liquid crystal display elements, since this makes impossible the formation of a uniform monodomain.

SUMMARY OF THE INVENTION

The object of this invention is to provide a process for making electro-optic elements, such as liquid crystal display elements, large-sized liquid crystal display panels, and liquid crystal-optical shutter arrays, which have uniform cell thickness.

According to one aspect of the present invention, there is provided a process for making electro-optic elements, which comprises the steps of:

a. setting up an enclosure by sealing peripheral areas of a pair of electrode plates spaced at a given distance, b. filling the enclosure with a liquid material capable of producing an electro-optical change through a filling hole thereof, and c. sealing the filling hole while applying pressure to the surface of the electrode plates constructing the enclosure.

According to another aspect of the present invention, there is provided a process for making electro-optic elements, which comprises the steps of:

a. setting up an enclosure by sealing peripheral areas of a pair of electrode plates spaced at a given distance, b. filling the enclosure with a liquid material capable of producing an electro-optical change through a filling hole thereof, and c. sealing the filling hole by applying an adhesive thereto and hardening the adhesive, while exerting pressure to the electrode plates of the enclosure with heating it at a temperature of 40°–60° C.

According to a further aspect of the present invention, there is provided a process for making electro-optic elements, which comprises the steps of:

a. applying an adhesive on peripheral area of the electrode-supporting side of an electrode plate, except a portion of asid area where the filling hole for the introduction of a liquid crystal is provided, b. scattering glass fiber, glass heads, or aluminum oxide particles over the entire surface of the electrode-supporting side of the counter electrode plate previously prepared, c. setting up an enclosure for a liquid crystal display element by superposing the two electrode plates provided in the steps (a) and (b) and by hardening the adhesive applied in the step (a), d. filling the enclosure for a liquid crystal display element with a liquid crystal through the filling hole, e. applying an adhesive to the filling hole while exerting pressure to both sides of the enclosure filled with the liquid crystal, and f. hardening the adhesive applied to the filling hole, to prepare a liquid crystal display element.

According to a further aspect of the present invention, there is provided a process for making electro-optic elements, which comprises the steps of:

a. applying an adhesive on peripheral area of the electrode-supporting side of an electrode plate, except a portion of the area where the filling hole for the introduction of a liquid crystal is provided, b. scattering glass fiber, glass beads, or aluminum oxide particles over the entire surface of the electrode-supporting side of the counter electrode plate previously prepared, c. setting up an enclosure for a liquid crystal display element by superposing the two electrode plates prepared in the steps (a) and (b) and by hardening the adhesive applied in the step (a), d. placing the enclosure in a vacuum chamber, evacuating the vacuum chamber, covering the filling hole with a liquid crystal, and then restoring the pressure in the chamber to the atmospheric, to fill the enclosure with the liquid crystal, e. applying an adhesive to the filling hole while exerting pressure to both sides of the enclosure, and f. hardening the adhesive applied to the filling hole to prepare a liquid crystal display element.

According to a further aspect of the present invention, there is provided an electro-optic element made by the process comprising the steps of:

a. applying an adhesive on the peripheral area of the electrode-supporting side of an electrode plate, except a portion of said area where the filling hole for the introduction of a liquid crystal is provided.

b. scattering glass fiber, glass beads, or aluminum oxide particles over the entire surface of the electrode-supporting side of the counter electrode plate previously prepared, c. setting up an enclosure for a liquid crystal display element by supperposing the two electrode plates provided in the steps (a) and (b) and by hardening the adhesive applied in the step (a), d. filling said enclosure with a liquid crystal through the filling hole, e. applying an adhesive to the filling hole while exerting pressure to both sides of the enclosure filled with the liquid crystal, and f. hardening the adhesive applied to the filling hole to prepare a liquid crystal display element.

DETAILED DESCRIPTION OF THE EMBODIMENTS OF THE INVENTION

In a preferred embodiment of this invention, a liquid crystal display element can be made up through the following steps:

(1) An adhesive (a mixture of an epoxy resin and an amine type hardener) containing glass fiber or glass beads of a definite diameter (6–20μ) is printed by a screening method in a width of about 0.1–5 mm on peripheral area of the electrode-supporting side of an electrode plate (made up of an electrode and a substrate of glass or plastic) except a part of the area where the filling hole for introducing a liquid crystal is provided, (2) Glass fiber, aluminum oxide particles, or glass beads of a definite diameter (6–20μ) are scattered over the entire surface of the electrode-supporting side of a counter electrode plate. In this step, the scattering may be accomplished by immersing the electrode plate in a dispersion of the above glass fiber or the glass beads in alcohol and evaporating the alcohol.

(3) The electrode plates prepared in the steps (1) and (2) are superposed and pressed at a pressure of about 0.5 Kg/cm$^2$ under suitable conditions for hardening the adhesive (at about 70–about 100° C.), for 30 minutes–2 hours). After the release of the pressure, the hardening is further conducted at a higher temperature of about 120°–150° C. for 1–2 hours to make up an enclosure for a liquid crystal display element which has a space of 6–20μ between the electrodes.

(4) The enclosure is set in a vacuum chamber, and after evacuation of the chamber, the filling hole is covered with a droplet of a liquid crystal. Then, the pressure in the chamber is restored to the atmospheric pressure to fill the liquid crystal into the enclosure with the aid of the pressure difference between the outside and inside of the enclosure.

Figure 2:
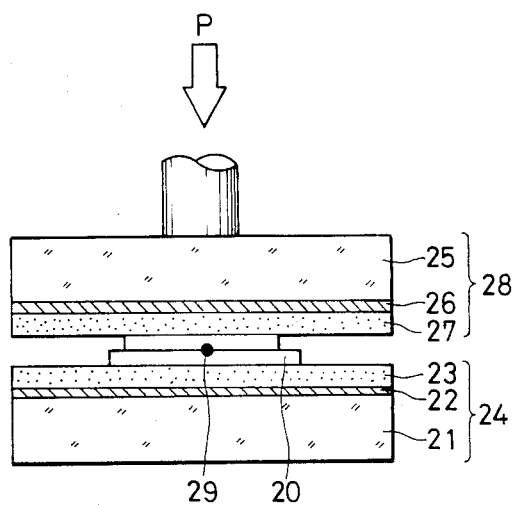
FIG. 2 is a cross-sectional view of a press for pressure sealing used in the process of this invention.

(5) The enclosure filled with the liquid crystal is set in a press as shown in FIG. 2 and is pressed at a pressure P (0.5–2 Kg/cm$^2$, preferably 1.0 Kg/cm$^2$) and a temperature of 40°–60° C. preferably about 50° C. After the excess liquid crystal has oozed out through the filling hole, a sealant is applied to the hole and hardened, while keeping the pressure as such.

Figure 3:
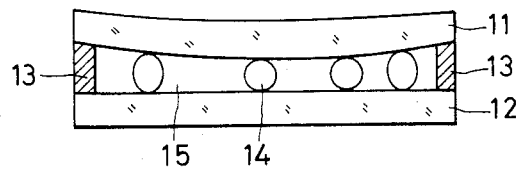
FIG. 3 is a cross-sectional view of a liquid crystal display element made according to the process of this invention.

The liquid crystal display element made up through the above steps has a uniform thickness as shown in FIG. 3, develops no pressure domain even when the cell in the display state is pressed with a finger, and exhibits good operational characteristics.

Figure 1:
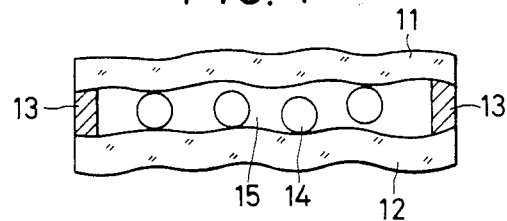
FIG. 1 is a cross-sectional view of a liquid crystal display element made according to a prior art process.

On the other hand, when the filling hole is sealed as in the above-mentioned steps without using such a press as used in Step 5 and as shown in FIG. 2, the resulting element is an unsatisfactory one like that in FIG. 1. That is, a liquid crystal display element as shown in FIG. 1 has undulated electrode plates 11 and 12 even though the peripheral regions of the gap between the electrode plates 11 and 12 have been sealed with the sealant 13 and glass fiber or glass beads have been distributed as inner spacer 14 so as to uniform the space between the electrode plates 11 and 12. Accordingly, a uniform monodomain will be formed with diffculty in the liquid crystal layer 15.

In a liquid crystal display element as shown in FIG. 3, the space between the electrode plates 11 and 12 can be made uniform to a precision of ± about 0.1μ and hence a uniform monodomain can be formed. Additionally, no pressure domain is produced even if the display element is pressed by exerting a pressure to the face in part of the electrode plates.

The press for the pressure sealing used in this invention as shown in FIG. 2 is constructed with (1) a stage 24 comprising a supporting plate 21 made of a metal such as stainless steel or aluminum, a heater 22 supported thereby, and a cushioning material 23 such as a sponge covering the heater 22 and (2) a pressing means 28 comprising a pressuring plate 25 made of a metal such as stainless steel or aluminum, a heater 26 supported thereby, and a cushioning material 27 such as sponge covering the heater 26. When the filling hole (not shown in the figure) of a liquid crystal cell 20 is sealed, a pressure P is exerted to the pressing means 28 and the filling hole can be sealed with a sealant 29.

Sealants which can be used in the process of this invention include organic resin-based adhesives such as epoxy adhesives and inorganic adhesives such as solder.

For applying the adhesive on the peripheral area of one of the electrode plates in the process of this invention, the usual screen printing method can be applied, wherein a plate made of stainless steel, glass, or plastic having meshes or perforations in prescribed regions thereof can be employed as screen. The shape of the perforation can be selected optionally from e.g. circular, elliptical triangular, and square forms. The adhesive is preferably applied on the electrode plate through perforations of such a screen plate by using a suitable coating means such as a roller, brush, or cloth. The electrode plate thus coated with the adhesive is opposed to the counter electrode plate, then the space between the electrode plates is kept at a definite value by a suitable pressuring means and the adhesive is hardened by heating to complete the seal. When the adhesive is applied, care must be taken not to coat therewith the area where the filling hole is provided. The adhesive may be applied also on the prescribed areas of the counter electrode plate by the same screening procedure.

In the adhesive used for this sealing, a suitable material such as glass fiber, glass beads, or aluminum oxide particles, which function as a spacer can be incorporated. This is favorable since the spacing and the sealing can be accomplished simultaneously.

As a liquid substance capable of electro-optical change, liquid electrochromic substance can also be used in place of the liquid crystal in this invention.

The display modes applicable to the liquid crystal display element in this invention involve a method utilizing the dynamic scattering phenomenon, i.e. the fact that a nematic liquid crystal material with a negative dielectric anisotopy scatters light on application of an electric field as well as a method affording an optically rotatory power to a nematic liquid crystal substance with a positive dielectric anisotropy by causing the material to assume a horizontal twisted orientation and changing the optical rotatory power by the action of a suitable electric field. In this invention, besides the above-mentioned nematic liquid crystals, smectic or cholesteric liquid crystals can also be employed separately or in combination.

In a preferred embodiment of this invention, it is possible to employ a twisted nematic liquid crystal (TN type), which is described by M. Schadt and W. Helfrich in "Voltage-Dependent Optical Activity of Twisted Nematic Liquid Crystal" [Applied Physics Letters, Vol. 18, No. 4, P. 127–128 (Feb. 15, '71)]. In the display mode utilizing this type of liquid crystal, molecules of a nematic liquid crystal with a positive dielectric anisotropy assume a twisted structure (helical structure) when no electric field is applied. When an electric field is applied, the liquid crystal molecules orient in the direction of the electric field, thus an optical change can be caused.

An example of the electrodes usable in this invention is a thin film of tin oxide or indium oxide formed on a portion or the entire of one side of a substrate by vapor deposition or some other means. This substrate is made of, for example, a transparent glass plate or plastic sheet. As an electrode of the display element employing a nematic liquid crystal having a positive dielectric anisotropy, a conductive film of tin oxide or indium oxide is particularly desirable to be coated with an insulation film of polyimide, silicon oxide, polybenzoxazole, polybenzothiazole, polybenzothiadiazole, poly-p-xylylene, or the like, treated by rubbing with a cloth or the like for the orientation control. Opaque conductive films suitable for use in this invention include, for example, aluminum, gold, silver, copper, and lead films.

This invention has advantages below; a liquid crystal cell of uniform thickness can be obtained, since the filling hole is sealed while applying a pressure from outside to the cell filled with a liquid crystal and thereby the insides of the electrode plates is brought into intimate contact with the inner spacer particles, and since the inside of the cell is in the state of reduced pressure when the pressure is released after completion of the sealing and hence the space between the electrode plates is kept in conformity with the diameter of the inner spacer particles due to the pressure difference between the outside and inside of the cell; in addition, when a keyboard made form a (polyethylene terephthalate) or the like is provided on the upper glass plate of the liquid crystal display element and a display image is formed by pressing the keyboard, no flexure of the glass plate is caused by the pressing even if the pressure reaches as far as the liquid crystal cell; the instability of display, viz. formation of the pressure domain, is prevented.

This invention is illustrated further referring to the following Example.

EXAMPLE 1

A polyimide-forming solution [a solution of polyimideisoindoloquinazoline-dion (PIQ) of Hitachi Kasei Co., Ltd., nonvolatile matter content: 14.5 wt %] was applied for 10 seconds with a spinner coater at 3,000 rpm on a 0.4 - mm thick glass substrate on which a stripe pattern electrode had been formed from ITO (indium-tin-oxide) and was heated at 120° C. for 30 minutes to form a 2-$\mu$ thick coating. This coating film was then rubbed with a velvet in the direction parallel to the stripe of the pattern electrode.

In this way, two electrode plates were prepared. The peripheral area (0.3 mm wide) of one of the electrode plates, except the part of the area where the liquid-crystal-filling hole was provided, were coated by screen method with an epoxy adhesive (a mixture of PC-401 of Haven Chem. Corp. and diaminodiphenylmethane) containing glass fiber (F - 6 of Nippon Denki Glass Co., Ltd.).

The same glass fiber was scattered over the entire surface of the other electrode plate (counter electrode plate). The former electrode plate was superposed on this one, where the stripes of the electrodes (accordingly, the rubbing directions) were crossed at right angles.

The superposed electrode plates were heated at 80° C. for 1 hour while applying a pressure of 0.5 Kg/cm$^2$ over the entire surface of the plates and at 130° C. for 90 minutes after the release of the pressure, thereby hardening the epoxy adhesive.

Figure 4:
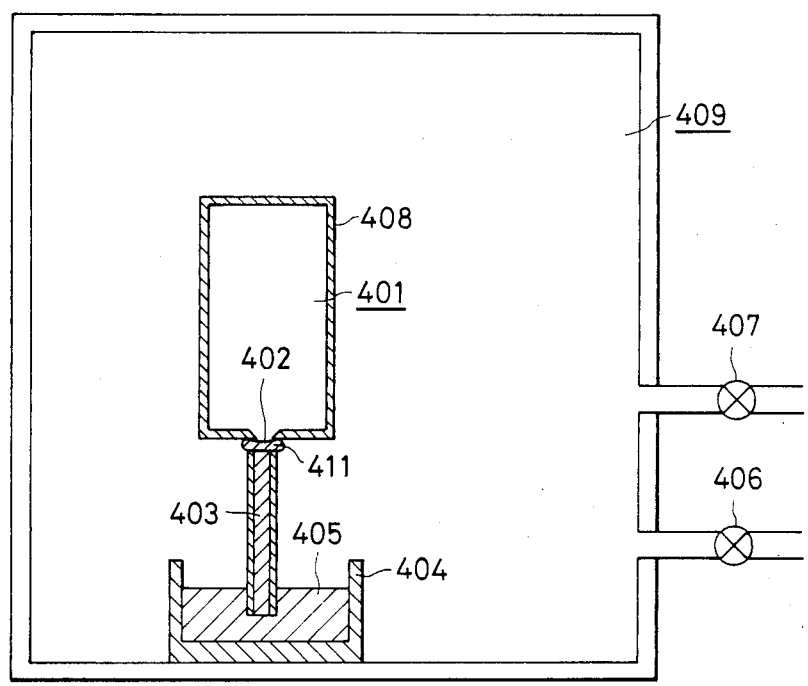
FIG. 4 is a cross-sectional view of a vacuum chamber employed for filling an enclosure with a liquid crystal in the process of this invention.

The enclosure thus prepared was set in a vacuum chamber a cross-sectional view of which are shown in FIG. 4. As shown therein, the enclosure 401 to which a glass capillary 403 (inner dia. 2 mm, length 5 mm) had been connected at the filling hole 402 was held by a supporting means (not shown in the Figure) with the capillary directed downward. In the vacuum chamber 409, a stainless steel boat 404 containing a nematic liquid crystal composition (ZLI 1694 made by Merck and Co.) having a positive dielectric anisotropy was placed previously.

After being shut, the chamber 409 was evacuated to a vacuum of 0.1 torr by closing a leak valve 406 and opening an vacuum valve 407. Then, the enclosure 401 was brought down to the position where the capillary 403 was filled with the liquid crystal up to the upper end by the capillarity. Thereafter, air was introduced into the vacuum chamber 409 by closing the vacuum valve 407 and opening the leak valve 406, whereby the nematic liquid crystal covering the filling hole 402 entered the enclosure 401 and after 5 minutes, filled it completely.

The enclosure filled with the liquid crystal was placed on the stage 24 of the press of which a sectional view is illustrated in FIG. 2, and was pressed at 50° C. with a pressure of 1 Kg/cm$^2$. As a result, some of the liquid crystal oozed out through the filling hole. Then, while keeping the same compression state, an epoxy adhesive (a mixture of PC - 401 of Haven Chem. Corp. and diaminodiphenylmethane) was applied to the filling hole to cover it and cured at 130° C. for 90 minutes to complete the sealing.

The liquid crystal cell thus obtained was found to have a liquid crystal layer 7.5±0.1$\mu$ thick, by the measurement with an interference film-thickness gage (TM - 250 of Canon K.K.). It was also found that the liquid crystal display element thus completed produced no pressure domain on applying pressure with a finger to the electrode plate. Further, the operation of the element by applying an alternating voltage of 3.0 V to the pattern electrodes gave a good display pattern.

What I claim is:

1. A process for making electro-optic elements, which comprises the steps of:
   a. setting up an enclosure by sealing peripheral areas of a pair of electrode plates spaced at a given distance,
   b. filling the enclosure with a liquid material capable of producing an electro-optical change through a filling hole thereof, and
   c. sealing the filling hole while applying positive pressure by a pressing means to the external surface of the electrode plates forming the enclosure.

2. The process of claim 1, wherein the liquid material capable of producing an electro-optical change is a liquid crystal.

3. The process of claim 1, wherein glass fiber, glass beads, or aluminum oxide particles are distributed in the enclosure.

4. The process of claim 1, in the step (c) of which the filling hole is sealed by applying an epoxy adhesive or a solder.

5. The process of claim 1, in the step (c) of which a pressure of 0.5–2 Kg/cm$^2$ is applied over the surface of the electrode plates constructing the enclosure.

6. A process for making electro-optic elements, which comprises the steps of:
   a. setting up an enclosure by sealing peripheral areas of a pair of electrode plates sapced at a given distance,
   b. filling the enclosure with a liquid material capable of producing an electro-optical change, through a filling hole thereof, and
   c. sealing the filling hole by applying an adhesive thereto and hardening the adhesive, while exerting positive pressure by a pressing means to the external surface of the electrode plates of the enclosure with heating at a temperature of 40°–60° C.

7. The process of claim 6, wherein the liquid material capable of producing an electro-optical change is a liquid crystal.

8. The process of claim 6, wherein glass fiber, glass beads, or aluminum oxide particles are distributed in the enclosure.

9. The process of claim 6, wherein the adhesive used in the step (c) is an epoxy adhesive or a solder.

10. The process of claim 6, in the step (c) of which a pressure of 0.5–2 Kg/cm$^2$ is applied over the entire surface of the electrode plates constructing the enclosure.

11. A process for making electro-optic elements, which comprises the steps of:
    a. applying an adhesive on the peripheral area of the electrode-supporting side of a first electrode plate, except for a portion of said area where the filling hole for the introduction of a liquid crystal is provided,
    b. scattering glass fiber, glass beads, or aluminum oxide particles over the entire surface of the electrode-supporting side of a second electrode plate,
    c. setting up an enclosure for a liquid crystal display element by superposing the two electrode plates provided in the steps (a) and (b) and by hardening the adhesive applied in the step (a),
    d. filling the enclosure for a liquid crystal display-element with a liquid crystal through the filling hole while exerting positive pressure by a pressing means to both external sides of the enclosure filled with the liquid crystal, and
    e. hardening the adhesive applied to the filling hole, to prepare a liquid crystal display element.

12. The process of claim 11, wherein the electrode-supporting side of one or both of the electrode plates have received rubbing treatment.

13. The process of claim 11, wherein the adhesive used in the step (a) comprises an epoxy resin and an amine hardener.

14. The process of claim 11, wherein the adhesive used in the step (e) comprises an epoxy resin and an amine hardner or is a solder.

15. The process of claim 11, wherein the application of an adhesive in the step (e) is carried out under heating.

16. The process of claim 11, in the step (e) of which a pressure of 0.5–2.0 Kg/cm$^2$ is exerted over the entire surface of the electrode plates of the enclosure.

17. The process of claim 11, wherein the adhesive used in the step (a) is a one containing glass fiber, glass beads, or aluminum oxide particles.

18. A process for making electro-optic elements, which comprises the steps of:
    a. applying an adhesive on the peripheral area of the electrode supporting side of a first electrode plate, except for a portion of the area where the filling hole for the introduction of a liquid crystal is provided,
    b. scattering glass fiber, glass beads, or aluminum oxide particles over the entire surface of the electrode supporting side of a second electrode plate,
    c. setting up an enclosure for a liquid crystal display element by superposing the two electrode plates prepared in the steps (a) and (b) and by hardening the adhesive applied in the step (a),
    d. placing the enclosure in a vacuum chamber, evacuating the vacuum chamber, covering the filling hole with a liquid crystal, and then restoring the pressure in the chamber atmospheric, to fill the enclosure with the liquid crystal,
    e. applying an adhesive to the filling hole while exerting positive pressure by a pressing means to both external sides of the enclosure, and
    f. hardening the adhesive used in step (e) to prepare a liquid crystal display element.

19. The process of claim 18, wherein the electrode-supporting sides of the electrode plates have received rubbing treatment.

20. The process of claim 18, wherein the adhesive used in the step (a) comprises an epoxy resin and an amine hardner.

21. The process of claim 18, wherein the adhesive used in the step (e) comprises an epoxy resin and an amine hardner or is a solder.

22. The process of claim 18, wherein the application of an adhesive in the step (e) is carried out under heating.

23. The process of claim 18, in the step (e) of which a pressure of 0.2–2.0 Kg/cm$^2$ is exerted over the entire surface of the electrode plates of the enclosure.

24. The process of claim 18, wherein the adhesive used in the step (a) contains glass fiber, glass beads, or aluminum oxide particles.

* * * * *

UNITED STATES PATENT AND TRADEMARK OFFICE
CERTIFICATE OF CORRECTION

PATENT NO. : 4,626,303           Page 1 of 2

DATED     : December 2, 1986

INVENTOR(S) : MAKOTO OGURA

It is certified that error appears in the above-identified patent and that said Letters Patent is hereby corrected as shown below:

AT [57] IN THE ABSTRACT

Line 1,    "are" should read --is--.

COLUMN 1

Line 38,    "difinite" should read --definite--.

COLUMN 2

Line 18,    "asid" should read --said--.
    Line 20,    "heads" should read --beads--.

COLUMN 3

Line 4,    "supperposing" should read --superposing--.
    Line 49,    "C.)," should read --C.,--.

COLUMN 4

Line 50,    "elliptical" should read --elliptical,--.

COLUMN 5

Line 8,    "anisotopy" should read --anisotropy--.
    Line 59,    "form" should read --from--.

COLUMN 7

Line 32,    "sapced" should read --spaced--.

UNITED STATES PATENT AND TRADEMARK OFFICE
CERTIFICATE OF CORRECTION

PATENT NO. : 4,626,303

DATED : December 2, 1986

INVENTOR(S) : MAKOTO OGURA

It is certified that error appears in the above-identified patent and that said Letters Patent is hereby corrected as shown below:

COLUMN 8

Line 16, "hardner" should read --hardener--.
Line 43, "atmospheric" should read --to atmospheric--.
Line 55, "hardner" should read --hardener--.
Line 58, "hardner" should read --hardener--.

Signed and Sealed this

Sixth Day of October, 1987

Attest:

DONALD J. QUIGG

Attesting Officer

Commissioner of Patents and Trademarks